US012586306B2

(12) United States Patent
Liu et al.

(10) Patent No.: US 12,586,306 B2
(45) Date of Patent: Mar. 24, 2026

(54) METHOD, ELECTRONIC DEVICE, AND COMPUTER PROGRAM PRODUCT FOR MODELING AN OBJECT UTILIZING A SPATIAL DISTRIBUTION AND DIFFERENCES BETWEEN FEATURES OF RESPECTIVE IMAGE PAIRS

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 399 days.

(21) Appl. No.: 18/337,537

(22) Filed: Jun. 20, 2023

(65) Prior Publication Data

US 2024/0404191 A1      Dec. 5, 2024

(30) Foreign Application Priority Data

Jun. 1, 2023    (CN) .......................... 202310645471.7

(51) Int. Cl.
　　 *G06T 7/55*　　　　(2017.01)
　　 *G06T 7/70*　　　　(2017.01)
　　 *G06T 17/00*　　　(2006.01)
(52) U.S. Cl.
　　 CPC ............... *G06T 17/00* (2013.01); *G06T 7/55* (2017.01); *G06T 7/70* (2017.01); *G06T 2200/08* (2013.01);
(Continued)
(58) Field of Classification Search
None
See application file for complete search history.

(56) References Cited

U.S. PATENT DOCUMENTS

2011/0007072 A1 *　1/2011　Khan ...................... G06T 7/564
　　　　　　　　　　　　　　　　　　　　　　345/420
2014/0025331 A1 *　1/2014　Ma .......................... G01S 17/89
　　　　　　　　　　　　　　　　　　　　　　702/141
(Continued)

OTHER PUBLICATIONS

B. Mildenhall et al., "NeRF: Representing Scenes as Neural Radiance Fields for View Synthesis," European Conference on Computer Vision, Aug. 2020, 17 pages.
(Continued)

*Primary Examiner* — Joni Hsu
(74) *Attorney, Agent, or Firm* — Ryan, Mason & Lewis, LLP

(57)　　　　　　ABSTRACT

A method for modeling an object in one embodiment includes: acquiring first position spatial information of a camera at a first position and second position spatial information of the camera at a second position, wherein the first position is different from the second position; generating a spatial distribution based on the first position spatial information and the second position spatial information, wherein the spatial distribution represents a probability distribution of space occupied by the object captured from a pose of the camera; generating a third image based on a first image captured at the first position, the spatial distribution, and the first position spatial information; generating a fourth image based on a second image captured at the second position, the spatial distribution, and the second position spatial information; and adjusting a model of the object based on the first image, the second image, the third image, and the fourth image.

20 Claims, 6 Drawing Sheets

(52) U.S. Cl.

CPC .............. *G06T 2207/10024* (2013.01); *G06T 2207/30244* (2013.01)

(56) References Cited

U.S. PATENT DOCUMENTS

| 2020/0043122 A1* | 2/2020 | Xiao ....................... G06T 15/80 |
| 2020/0090575 A1* | 3/2020 | Martin .................... G06F 3/012 |
| 2022/0301182 A1* | 9/2022 | Mahjourian ......... G06V 20/584 |
| 2023/0104977 A1* | 4/2023 | Zaghetto .............. H04N 19/597 |
| | | 375/240.02 |
| 2025/0124601 A1* | 4/2025 | Park ....................... H04N 19/85 |

OTHER PUBLICATIONS

T. Müller et al., "Instant Neural Graphics Primitives with a Multiresolution Hash Encoding," arXiv:2201.05989v2, May 4, 2022, 15 pages.

J. T. Barron et al., "Mip-NeRF 360: Unbounded Anti-Aliased Neural Radiance Fields," Conference on Computer Vision and Pattern Recognition, arXiv:2111.12077v3, Mar. 25, 2022, 18 pages.

G. Gafni et al., "Dynamic Neural Radiance Fields for Monocular 4D Facial Avatar Reconstruction," IEEE/CVF Conference on Computer Vision and Pattern Recognition, Jun. 2021, pp. 8649-8658.

S. Liu et al., "Editing Conditional Radiance Fields," International Conference on Computer Vision, arXiv:2105.06466v2, Jun. 4, 2021, 24 pages.

C. Wang et al., "CLIP-NeRF: Text-and-Image Driven Manipulation of Neural Radiance Fields," arXiv:2112.05139v3, Mar. 2, 2022, 13 pages.

A. Radford et al., "Learning Transferable Visual Models From Natural Language Supervision," International Conference on Machine Learning, arXiv:2103.00020v1, Feb. 26, 2021, 48 pages.

S. Zhi et al., "In-Place Scene Labelling and Understanding with Implicit Scene Representation," International Conference on Computer Vision, arXiv:2103.15875v2, Aug. 21, 2021, 14 pages.

S. Kobayashi et al., "Decomposing NeRF for Editing via Feature Field Distillation," arXiv:2205.15585v1, May 31, 2022, 23 pages.

I. Mehta et al., "Modulated Periodic Activations for Generalizable Local Functional Representations," IEEE/CVF International Conference on Computer Vision (ICCV), Oct. 2021, pp. 14214-14223.

X. Zhang et al., "NeRFactor: Neural Factorization of Shape and Reflectance under an Unknown Illumination," ACM Transactions on Graphics, vol. 40, No. 6, Dec. 2021, pp. 237:1-237:18.

V. Rudnev et al., "NeRF for Outdoor Scene Relighting," 17th European Conference on Computer Vision, Oct. 2022, 17 pages.

M. Boss et al., "NeRD: Neural Reflectance Decomposition from Image Collections," IEEE/CVF International Conference on Computer Vision (ICCV), Oct. 2021, pp. 12684-12694.

R. Basri et al., "Lambertian Reflectance and Linear Subspaces," Weizmann Institute of Science, Technical Report MCS00-21, NEC Research Institute Technical Report 2000-172R, Mar. 2023, 27 pages.

B. Li et al., "Language-driven Semantic Segmentation," International Conference on Learning Representations, arXiv:2201.03546v2, Apr. 3, 2022, 13 pages.

M. Caron et al., "Emerging Properties in Self-Supervised Vision Transformers," IEEE/CVF Conference on Computer Vision and Pattern Recognition. Jun. 2021, pp. 9650-9660.

J. L. Schonberger et al., "Structure-from-Motion Revisited," IEEE Conference on Computer Vision and Pattern Recognition (CVPR), Jun. 2016, pp. 4104-4113.

W. Cheng et al., "Cascaded Parallel Filtering for Memory-Efficient Image-Based Localization," IEEE/CVF International Conference on Computer Vision (ICCV), Nov. 2019, pp. 1032-1041.

D. Campbell et al., "Solving the Blind Perspective-n-Point Problem End-To-End With Robust Differentiable Geometric Optimization," arXiv:2007.14628v2, Sep. 8, 2020, 18 pages.

U.S. Appl. No. 17/984,474 filed in the name of Zhisong Liu et al. on Nov. 10, 2022, and entitled "Method, Electronic Device, and Computer Program Product for Generating Three-Dimensional Scene."

U.S. Appl. No. 18/144,289 filed in the name of Zhisong Liu et al. on May 8, 2023, and entitled "Method, Device, and Computer Program Product for Rendering."

U.S. Appl. No. 18/319,577 filed in the name of Zhisong Liu et al. on May 18, 2023, and entitled "Method, Device, and Computer Program Product for Determining Camera Pose for an Image."

* cited by examiner

200

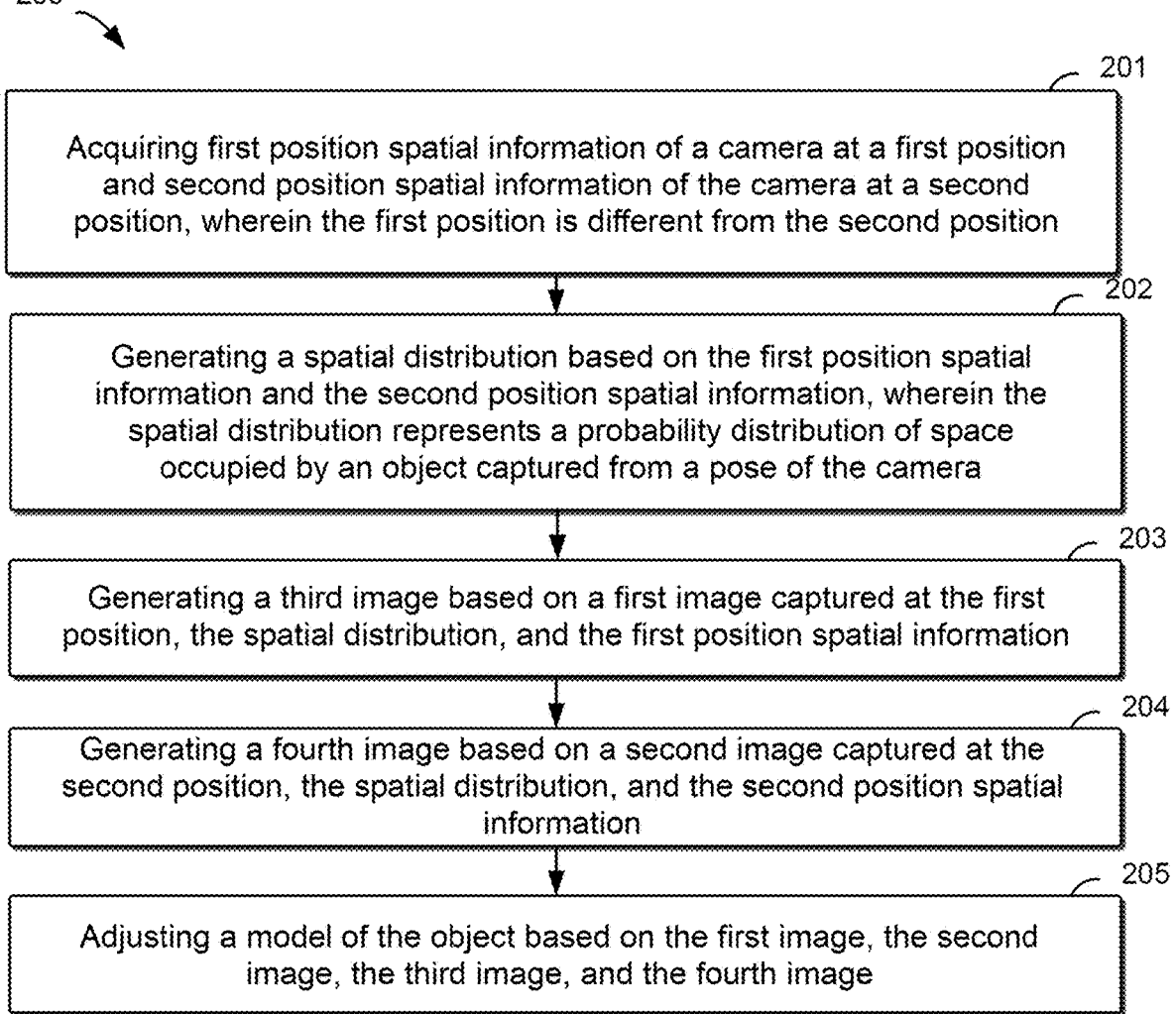

201

Acquiring first position spatial information of a camera at a first position and second position spatial information of the camera at a second position, wherein the first position is different from the second position

202

Generating a spatial distribution based on the first position spatial information and the second position spatial information, wherein the spatial distribution represents a probability distribution of space occupied by an object captured from a pose of the camera

203

Generating a third image based on a first image captured at the first position, the spatial distribution, and the first position spatial information

204

Generating a fourth image based on a second image captured at the second position, the spatial distribution, and the second position spatial information

205

Adjusting a model of the object based on the first image, the second image, the third image, and the fourth image

FIG. 2

METHOD, ELECTRONIC DEVICE, AND COMPUTER PROGRAM PRODUCT FOR MODELING AN OBJECT UTILIZING A SPATIAL DISTRIBUTION AND DIFFERENCES BETWEEN FEATURES OF RESPECTIVE IMAGE PAIRS

RELATED APPLICATION

The present application claims priority to Chinese Patent Application No. 202310645471.7, filed Jun. 1, 2023, and entitled "Method, Electronic Device, and Computer Program Product for Modeling Object," which is incorporated by reference herein in its entirety.

FIELD

Embodiments of the present disclosure relate to the field of computers, and in particular to a method, a device, and a computer program product for modeling an object.

BACKGROUND

Deep learning technologies have been widely applied in various fields, including the field of three-dimensional (3D) model processing. The basic idea of using deep learning for 3D new view synthesis is to use deep convolutional neural networks to learn implicit representations.

SUMMARY

Embodiments of the present disclosure relate to a method, an electronic device, and a computer program product for modeling an object.

According to a first aspect of the present disclosure, a method for modeling an object is provided. The method includes: acquiring first position spatial information of a camera at a first position and second position spatial information of the camera at a second position, wherein the first position is different from the second position; generating a spatial distribution based on the first position spatial information and the second position spatial information, wherein the spatial distribution represents a probability distribution of space occupied by the object captured from a pose of the camera; generating a third image based on a first image captured at the first position, the spatial distribution, and the first position spatial information; generating a fourth image based on a second image captured at the second position, the spatial distribution, and the second position spatial information; and adjusting a model of the object based on the first image, the second image, the third image, and the fourth image.

According to a second aspect of the present disclosure, an electronic device for modeling an object is provided, comprising: at least one processor, and a memory coupled to the at least one processor and having instructions stored thereon, wherein the instructions, when executed by the at least one processor, cause the electronic device to perform actions including: acquiring first position spatial information of a camera at a first position and second position spatial information of the camera at a second position, wherein the first position is different from the second position; generating a spatial distribution based on the first position spatial information and the second position spatial information, wherein the spatial distribution represents a probability distribution of space occupied by the object captured from a pose of the camera; generating a third image based on a first image captured at the first position, the spatial distribution, and the first position spatial information; generating a fourth image based on a second image captured at the second position, the spatial distribution, and the second position spatial information; and adjusting a model of the object based on the first image, the second image, the third image, and the fourth image.

According to a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform steps of the method implemented in the first aspect of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

FIG. 2 illustrates a flow chart of a method for modeling an object according to embodiments of the present disclosure;

DETAILED DESCRIPTION

Figure 1:
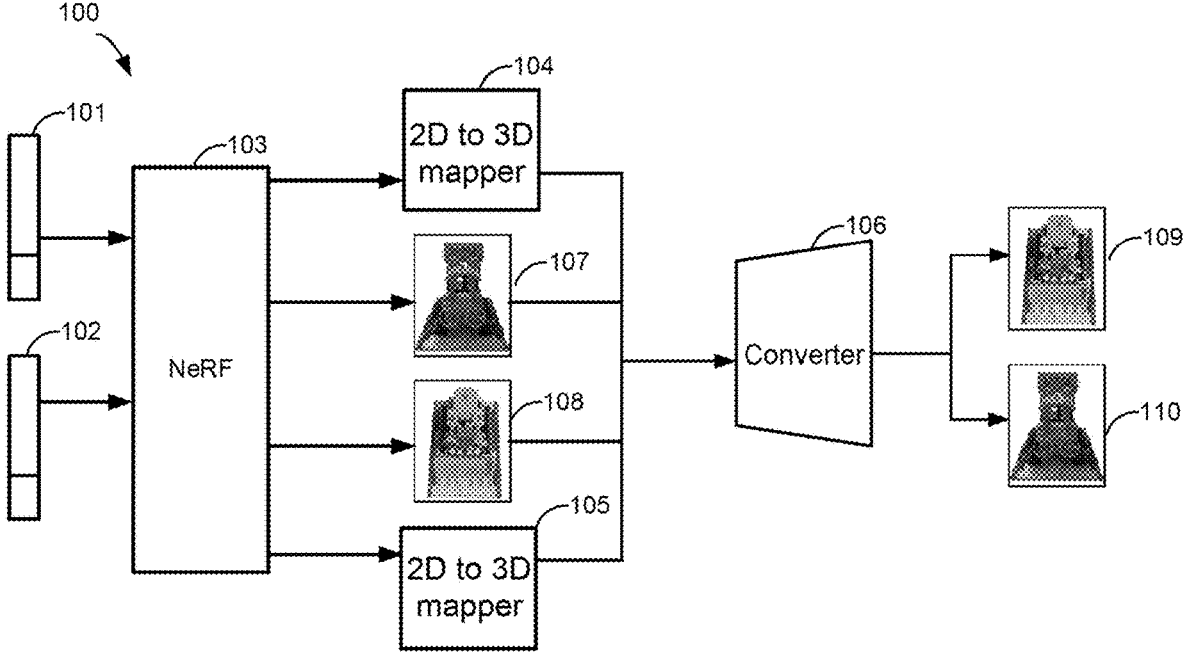
FIG. 1 illustrates an architectural diagram of a 3D model processing system according to embodiments of the present disclosure.

The following will describe illustrative embodiments of the present disclosure in more detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Metaverse is receiving increasing amounts of public attention as a new generation Internet trend. Metaverse is a virtual world constructed using digital technologies, which is mapped by the real world or transcends the real world, and can interact with the real world. In order to construct a realistic metaverse world, accurate 3D modeling of a scene/ an object is required. One issue that needs to be addressed is whether users can use metaverse applications anywhere without worrying about latency in computation and data access.

One method is to use a neural radiance field (NeRF) based deep learning technology. Given pairs of camera positions and scenes, it uses differentiable volume rendering techniques to sample the implicit 3D space for realistic scene reconstruction. However, there are many issues to be addressed in the NeRF-based implementations, one of which is the need for strict supervision using paired data during the training of NeRF and the low inference speed, which makes it inefficient in real-time applications. The NeRF-based implementations do not learn 3D semantic representations for scene understanding. For example, some implementations only address the auxiliary shapes and color codes used for conditional NeRF rendering, and they are only applicable to small and simple objects such as chairs and cups. Some implementations are hybrid models based on the Clip language model and NeRF, and they can be used for text-driven scene generation and generation of scenes that match text descriptions, but cannot identify semantic differences at a real-time level. In some implementations, semantic segmentation networks for joint geometric and semantic prediction are introduced, and the correlation between segmentation and scene prediction can also benefit from the smoothness and self-similarity of self-supervised learning. In some implementations, extraction of information from a self-supervised feature extractor (e.g., CLIP-LSeg or DINO) is also included to process 3D neural fields in parallel. The shortcoming of these implementations is the limited freedom of user query and editing. The above implementations also do not take into account influences caused by camera poses, and they do not decompose an object shape from an observation direction, which makes it difficult for a network to learn.

At least to address the above and other potential problems, embodiments of the present disclosure provide a method for modeling an object. The method includes: acquiring first position spatial information of a camera at a first position and second position spatial information of the camera at a second position, wherein the first position is different from the second position; generating a spatial distribution based on the first position spatial information and the second position spatial information, wherein the spatial distribution represents a probability distribution of space occupied by the object captured from a pose of the camera; generating a third image based on a first image captured at the first position, the spatial distribution, and the first position spatial information; generating a fourth image based on a second image captured at the second position, the spatial distribution, and the second position spatial information; and adjusting a model of the object based on the first image, the second image, the third image, and the fourth image. By using this method, a framework (e.g., a framework based on what is referred to herein as NeRF 360) is provided, which can reduce the inference time and enable embedding into portable devices such as smart phones for use in dedicated 3D view rendering, and decouple the coordinate and direction mapping by attaching a view-related 3D warping module to the equivalent view synthesis. An effective and reliable training solution is also provided by the present method, which can reduce the effort to collect and process the required photos.

Fundamental principles and several example embodiments of the present disclosure will be described in detail below with reference to the accompanying drawings. FIG. 1 illustrates an architectural diagram of a 3D model processing system 100 according to embodiments of the present disclosure. It should be understood that the numbers and arrangement of components, elements, and systems illustrated in FIG. 1 are examples only, and the architectural diagram may include different numbers and different arrangements of components, elements, and systems.

According to implementations of the present disclosure, the 3D model processing system (which may also be referred to as a NeRF 360 system) 100 can implement any 360-degree 3D scene or object modeling and may include three main components: a basic NeRF network 103, two-dimensional (2D) to three-dimensional (3D) mappers 104 and 105, and a converter 106, wherein the basic NeRF network 103 can be used for implicit view synthesis of data 101 and 102 of a shoot object. The 2D to 3D mappers 104 and 105 can be used for projection of features in the data 101 and 102, and the 2D to 3D mappers 104 and 105 can be the same or different components, which is not limited in the present disclosure in any way. The converter 106 can be used for explicit 3D feature warping. According to some implementations of the present disclosure, the basic NeRF network 103 is a realistic neural renderer, which can learn 3D representations from multi-view images, and can then render new views based on an input camera pose and spatial position. The quality of the high-definition visualization reconstructed by it surpasses that of other methods, which is an advantage that makes it suitable for metaverse buildings and virtual reality applications.

First, the basic NeRF network 103 in the 3D model processing system 100 may receive data 101 and data 102, also referred to herein as data $T(x,d)$ and data $T^*(x,d)$, respectively, containing camera pose information (d) and camera position information (x) as well as image features as input to learn the corresponding object view rendering, where the camera pose may indicate the rotation and translation of the camera coordinate system with respect to a reference coordinate system (world coordinate system) and may include information such as the angle of the corresponding camera at the time of taking photographs. Additionally or alternatively, in some embodiments, the poses of cameras used to take images of the same object at different positions may be symmetrical to each other.

In response to receiving the data 101 and 102 of the object, a (plurality of) 2D to 3D mapper(s) may project 2D features of the images therein into 3D space so that a (plurality of) explicit 3D representation(s), such as 3D representations 107 and 108, may be obtained. The converter 106 can then perform an explicit view conversion of the explicit 3D representations 107 and 108, for example, by rotating the corresponding camera angle, etc., to obtain the converted 3D representations 109 and 110, and finally, the equivalent view synthesis can be completed. In some embodiments, the converted 3D representation 109 may be the result obtained from the processing of the 3D representation 107 by the converter 106. The converted 3D representation 110 may be the result obtained from the processing of the 3D representation 108 by the converter 106.

The 3D model processing system 100 may be installed with any computing device having processing computing resources or storage resources. For example, the computing device may have common capabilities of receiving and sending data requests, real-time data analysis, local data storage, real-time network connectivity, and the like. The computing device may typically include various types of devices. Examples of the computing device may include, but are not limited to, desktop computers, laptop computers, smartphones, wearable devices, security devices, smart manufacturing devices, smart home devices, Internet of Things (IoT) devices, smart cars, drones, and the like. In embodiments according to the present disclosure, any number and any type of devices may be included, which is not limited in the present disclosure in any way.

A schematic diagram of the architecture of a 3D model processing system in which the method and/or process according to embodiments of the present disclosure can be implemented is described above in conjunction with FIG. 1. A flow chart of a method 200 for modeling an object that is used for a 3D model processing system according to embodiments of the present disclosure will be described below in conjunction with FIG. 2. As described above for the 3D model processing system, the method 200 for modeling an object according to embodiments of the present disclosure may be performed at an edge device with computing power or at a cloud server, which is not limited in the present disclosure. In order to enable faster 3D modeling of an object and equivalent view synthesis, the method 200 for modeling an object according to embodiments of the present disclosure is provided.

At block 201, the method 200 includes acquiring first position spatial information of a camera at a first position and second position spatial information of the camera at a second position, wherein the first position is different from the second position. According to embodiments of the present disclosure, the 3D model processing system can first acquire spatial information about the position at which the camera for shooting the object is located, and the position spatial information may include the position information of the camera (i.e., the position of the camera on the xyz spatial coordinate axes) and the pose information of the camera (i.e., the information about the angle presented by the camera at that position). Additionally or alternatively, the second position may be another position different from the first position. For example, the second position may be another position symmetrical to the first position.

At block 202, the method 200 includes generating a spatial distribution based on the first position spatial information and the second position spatial information, wherein the spatial distribution represents a probability distribution of space occupied by the object captured from a pose of the camera. The spatial distribution can be understood as a probability distribution along the rays for shooting by the camera. With this spatial distribution, the distribution of the object on the rays can be approximately obtained.

At block 203, the method 200 includes generating a third image based on a first image captured at the first position, the spatial distribution, and the first position spatial information. According to embodiments of the present disclosure, the 3D model processing system can generate a first model of the object based on the first image and the spatial distribution. If the probability of a (plurality of) point(s)/position(s) sampled based on the spatial distribution is greater than a predetermined threshold, it can be considered that an object or part of an object may exist at the (plurality of) point(s)/position(s). It is then possible to continue to finely calculate information about the color, texture, depth, etc., of the object or the part of the object at the point(s)/position(s). Furthermore, the previously obtained probability can be used to further calculate the color weight of the object or the part of the object. As an example, after the 3D model processing system determines that a probability value above the predetermined threshold of the spatial distribution exists at a position in the first image, the 3D model processing system may acquire one or more of color information, texture information, and depth information at the position. Additionally or alternatively, the predetermined threshold may be a threshold specified by a user based on actual application needs.

The 3D model processing system can then generate a second model by performing a grid transformation of the first model based on the pose of the camera in the first position spatial information, for example, the 3D model processing system can generate the second model by converting the first model by a certain angle. The 3D model processing system can then perform a 3D to 2D transformation of the second model, for example, by means of projection via a converter therein, to convert the second model to a 2D third image. Additionally or alternatively, in the process of generating the second model by performing the grid transformation of the first model, the converter can also apply a bicubic interpolation method on features in the first model so that features in the second model can be predicted.

At block 204, the method 200 includes generating a fourth image based on a second image captured at the second position, the spatial distribution, and the second position spatial information. The 3D model processing system can generate a third model based on the second image and the spatial distribution in a similar manner. The 3D model processing system can also generate a fourth model by performing a grid transformation of the third model based on the pose of the camera in the second position spatial information. Finally, the 3D model processing system can generate the fourth image by performing a 2D transformation of the fourth model.

In the generated image, the image content or features of the third image may correspond to the content or features of the second image, and the content or features of the fourth image correspond to the content or features of the first image. In other words, the third image is the content of the second image predicted and generated by the 3D model processing system based on the first image, and the fourth image is the content of the first image predicted and generated by the 3D model processing system based on the second image.

At block 205, the method 200 includes adjusting the model based on the first image, the second image, the third image, and the fourth image. The 3D model processing system can first calculate a first difference between features of the third image and features of the second image. The 3D model processing system can also calculate a second difference between features of the fourth image and features of the first image. If the sum of the first difference and the second difference is greater than a predetermined threshold, it indicates that the 3D model processing system still needs to be trained, and the iterative training and adjustment of the 3D model processing system can be continued by means of continuing to adjust the model of the object generated by the 3D model processing system. If the sum of the first difference and the second difference is smaller than the predetermined threshold, it indicates that the 3D model processing system has reached the desired training effect, and then, the iterative training and adjustment of the 3D model processing system can be stopped by means of stopping the adjustment of the model of the object.

Additionally or alternatively, in the process of adjusting the model of the object, the model of the object may be adjusted based on spatial density information, color information, texture information, and depth information of one or more of the first image, the second image, the third image, and the fourth image. In some embodiments, the predetermined threshold as to whether to adjust the object may be specified by the user. In some embodiments, in order to increase the versatility of the generated model, a jitter effect can also be applied to the camera during the shooting process, thus enhancing the versatility and stability of the finally generated model.

Figure 3:
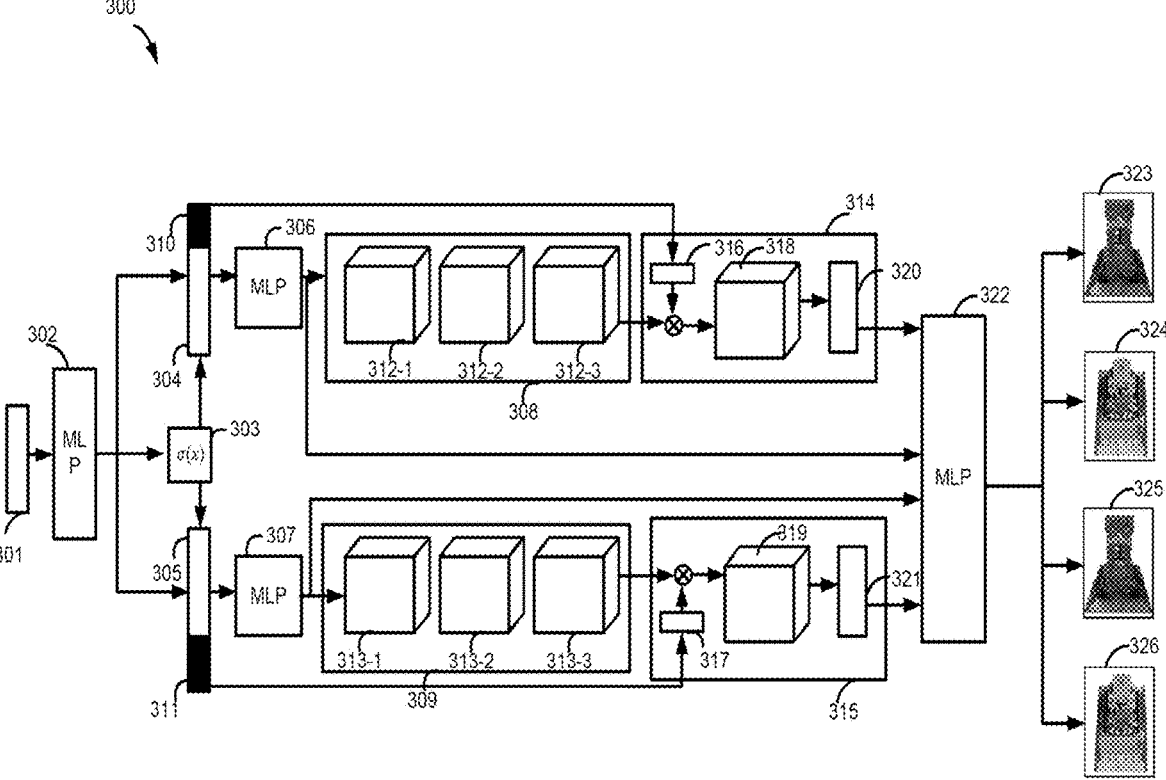
FIG. 3 illustrates a schematic diagram of a process for training a 3D model processing system.

FIG. 3 illustrates a schematic diagram of a process 300 for training a 3D model processing system. Conventional NeRF-based systems typically process 3D information in the MLP (multilayer perceptron) layer, and although the process is simple and efficient, it ignores 3D prior knowledge to achieve better reconstruction. By contrast, in implementations according to the present disclosure, symmetry attributes can be injected into the model modeling process for an object by performing supervised training of a 3D model processing system using symmetric camera poses. The process 300 of training the 3D model processing system based on embodiments according to the present disclosure will be described below.

According to embodiments of the present disclosure, given sufficient training images taken from a target scene, the 3D model processing system can be trained. The image and the camera position $x=(x,y,z)$ and camera pose $d=(\theta,\phi)$ corresponding to the image can be input to the 3D model processing system, where $\theta$ and $\phi$ denote the x rotation angle and y rotation angle of the camera, respectively. The 3D model processing system can output the corresponding spatial density/spatial distribution $\sigma$ and image features such as the RGB color $c=(r,g,b)$ based on the acquired camera position $x=(x,y,z)$ and camera pose $d=(\theta,\phi)$. According to embodiments of the present disclosure, the camera position $x=(x,y,z)$ and the camera pose $d=(\theta,\phi)$ may be collectively referred to as the position spatial information.

As an example, the (plurality of) image(s) taken by the camera and the position spatial information 301 associated with these images can be fed to an MLP layer 302 in the 3D model processing system for processing, thereby obtaining the corresponding spatial density/spatial distribution 303, also denoted as $\sigma$, the camera pose information 310 and 311, also denoted as T(d) and T(d\*), respectively, and the corresponding image features 304 and 305. The spatial distribution 303 can be defined as the probability that a 3D object occupies space in the entire space as learned by taking the pose of the camera as the input to be learned. In some embodiments, the image features 304 and 305 are image features obtained by the 3D model processing system shooting the same object in a plurality of different poses. Additionally or alternatively, the first angle and the second angle in the plurality of poses may form one hundred and eighty degrees with each other.

Additionally or alternatively, in some embodiments, the 3D model processing system can also predict the pixel colors to be generated. For example, a predicted pixel color $c(r)$ is calculated by projecting light into the volume in a direction d starting from a camera origin o, $r=o+td$ (t is the depth of the light), and accumulating color based on the density along the light. The 3D model processing system may estimate the accumulated color by taking N point samples along the light to perform volume plotting, with reference to the following equation:

$$\mathcal{L} = \sum_{r \in \mathcal{R}} \left[ \left\| \hat{C}_c(r) - C(r) \right\|_2^2 + \left\| \hat{C}_f(r) - C(r) \right\|_2^2 \right] \tag{1}$$

$$\hat{C}_c(r) = \sum_{i=1}^{N_c} w_i c_i, \text{ where } w_i = T_i\left(1 - \exp(-\sigma_i \delta_i)\right)$$

$$\hat{C}_f(r) = \sum_{i=1}^{N} T_i\left(1 - \exp(-\sigma_i \delta_i)\right)c_i, \text{ where } T_i = \exp\left(-\sum_{j=1}^{i-1} \sigma_i \delta_i\right)$$

where $\hat{C}_c(r)$ and $\hat{C}_f(r)$ are coarsely estimated color and finely estimated color, respectively, $\sigma_i$ is the volume density, and r is the camera light. Spanning the depth from a near camera plane to a far camera plane along (o,d), the depth t is selected from a uniform distribution using stratified sampling, both the density $\sigma$ and the color c are modeled by using MLP, and the final rendering is trained in a self-supervised manner by using observed true per pixel colors. It is not about performing a single rendering process, but rather sampling points in a stratified manner first. Then, densities at these points are used for importance sampling in the final process. Thus, the final model is learned by monitoring the rendered pixel colors of these two processes with real colors.

According to embodiments of the present disclosure, the distance from the position of the camera to the center of the target object may be normalized during training of the 3D model processing system. In this way, the distance between the camera and the object is a constant and may be ignored in the calculation. In addition, the camera pose can be changed from an observer-centered perspective to an object-centered perspective. For example, given the camera position T(x,d), its symmetrical camera position may be T\*(x, d)=T(x, 360−d). In addition, according to embodiments of the present disclosure, a Siren module can also be used to divide the signal domain into blocks for feature extraction, thereby simplifying the signal locally. Sinusoidal activation is used for a wider spectrum, and the process can be represented as:

$$h_i = \alpha_i \odot \sin(w_i h_{i-1} + b_i) \tag{2}$$

where $w_i$ and $b_i$ are a learnable weight and deviation for the i-th layer, $\alpha$ is a modulation variable, $h_i$ is a hidden feature, and $h_0$ is an input coordinate.

In some embodiments, the spatial distribution 303 can also be used to construct a model of the object along with one or more of the image features 304 and/or 305. For example, the 3D model processing system can partition the entire image space captured into several 1×1×1 spatial blocks, and the 3D model processing system can then judge whether there is a probability value above a predetermined threshold of the spatial distribution 303 in the spatial block. If there is a probability value above the predetermined threshold of the spatial distribution 303 in the spatial block, it means that the spatial block may have image features of the shot object. In other words, the spatial block is preliminarily rendered. Additionally or alternatively, the predetermined threshold of the spatial distribution 303 may be arbitrarily specified by the user.

When it is determined that there is a probability value above the predetermined threshold of the spatial distribution 303 in the spatial block, the 3D model processing system can further acquire the corresponding color information, texture information, depth information, and other information in the spatial block. In some embodiments, the image features 304 and 305, the camera pose information 310 and 311, and the data of the corresponding color information, texture information, depth information, and other information can be fed to the 2D to 3D mappers 308 and 309 via the MLP layers 306 and 307 in the 3D model processing system for projection of these feature data, thereby obtaining one or more models corresponding to the image.

The 2D to 3D mappers 308 and 309 can in turn transform the received 2D features ($F \in \mathbb{R}^{N \times D}$) into a 3D shape/model ($G \in \mathbb{R}^{m \times m \times D}$). The 2D to 3D mappers 308 and 309 can further apply a 3D convolutional network to process the 3D model to generate one or more cube vectors $G \in \mathbb{R}^{m \times m \times m}$ 312-1, 312-2, 312-3 and 313-1, 313-2, 313-3, etc., where N=m×m is the number of pixels, and D is the dimensionality of the 2D feature.

According to embodiments of the present disclosure, the converters 314 and 315 take the 3D feature map including the cube vectors 312-1, 312-2, etc., as an input of dimension m×m×m. Additionally or alternatively, the converters 314 and 315 can also input the camera pose information 310 and 311 of the camera as conditions into grid generators 316 and 317 in the converters 314 and 315, and the grid generators 316 and 317 can convert the camera pose (θ,φ) into a six-degree camera matrix S, for example, through a cross product operation. The converters 314 and 315 then perform a grid conversion of the 3D feature map into target 3D feature maps/models 318 and 319 corresponding to the target camera pose. For sub-pixels, it uses bicubic interpolation to predict the features in the model to be generated.

According to embodiments of the present disclosure, the target 3D feature maps/models 318 and 319 converted by the converters 314 and 315 and corresponding to the target camera pose may be projected into 2D feature maps F' 320 and 321. The final MLP layer 322 in the 3D model processing system can acquire from the 2D feature maps F' 320 and 321 the data of the corresponding color information, such as RGB values, texture information, depth information, and other information for use in image reconstruction.

During the training process, the 3D model processing system can generate at least four images 323 to 326, where the images 323 and 324 are images that are obtained by the 3D model processing system through shooting at different locations with the camera without processing by the 2D to 3D mappers 308 and/or 309 and the converters 314 and/or 315. The images 325 and 326 are images that are generated by the 3D model processing system based on the images 323 and 324 and through processing by the 2D to 3D mappers 308 and/or 309 and converters 314 and/or 315. The image 323 may correspond to the content and/or features in the image 325, and the image 324 may correspond to the content and/or features in the image 326.

The 3D model processing system may eventually be trained as a Siamese network. In other words, for pairs of compensated camera parameters/position spatial information T(x,d) and T(x, d*), the 3D model processing system can obtain corresponding four novel views $V^{x,d}$, $V^{x,d*}$, $V_t^{x,d}$, and $V_t^{x,d*}$ through prediction, where $V_t$ is the converted version of V, and the loss in relation to the ground truth image can be calculated as:

$$\mathcal{L} = \sum_{V \in V^{x,d,d^*}} \sum_{V \in V_t^{x,d,d^*}} \sum_{r \in \mathcal{R}} \left[ M \cdot \|\hat{C}_c(r) - C(r)\|_2^2 + M \cdot \|\hat{C}_f(r) - C(r)\|_2^2 \right] \quad (3)$$

-continued $$\hat{C}_c(r) = \sum_{i=1}^{N_c} w_i c_i, \text{ where } w_i = T_i\left(1 - \exp(-\sigma_i \delta_i)\right)$$

$$\hat{C}_f(r) = \sum_{i=1}^{N} T_i\left(1 - \exp(-\sigma_i \delta_i)\right)c_i, \text{ where } T_i = \exp\left(-\sum_{j=1}^{i-1} \sigma_i \delta_i\right)$$

where the mask M is applied to the MSE (mean square error) loss to constrain the training optimization for the region of interest, and M can be arbitrarily specified by the user.

In some embodiments, the 3D model processing system can calculate the difference or similarity between the contents and/or features in the images 323 and 325 through comparison to obtain a first difference. The 3D model processing system can also calculate the difference or similarity between the contents and/or features in the images 324 and 326 through comparison to obtain a second difference. Finally, by calculating the sum of the first difference and the second difference and judging whether it meets a predetermined threshold specified by the user, it is judged whether the training goal desired by the user has been achieved. For example, if the calculated sum of the first difference and the second difference is greater than the predetermined threshold, it is indicated that the 3D model processing system still needs to be trained. If the calculated sum of the first difference and the second difference is smaller than the predetermined threshold, it is indicated that the training of the 3D model processing system has reached the desired goal, and the training of the 3D model processing system can be stopped. In some embodiments, the image content and/or features may include spatial density information, color information, texture information, and depth information.

The paired images can be used for better optimization during the training process. In other words, when taking images of a target object, the cameras can be placed evenly surrounding the object, and it is ensured that there is a symmetrical view for training. Alternatively, it is also possible to fix the position of the camera and try to rotate the object 360 degrees to capture multiple symmetric views. In order to improve the versatility of the 3D model processing system, ray direction jitter can also be applied during the object shooting process. For example, sub-pixel jitter can be applied to the ray direction. In contrast to shooting at the center of pixels, jitter ψ can be used as $x_i = o + t_i(d + \psi)$. Uniform sampling can be performed on ψ so that the generated light remains confined to the boundaries of its specified pixels.

Figure 4:
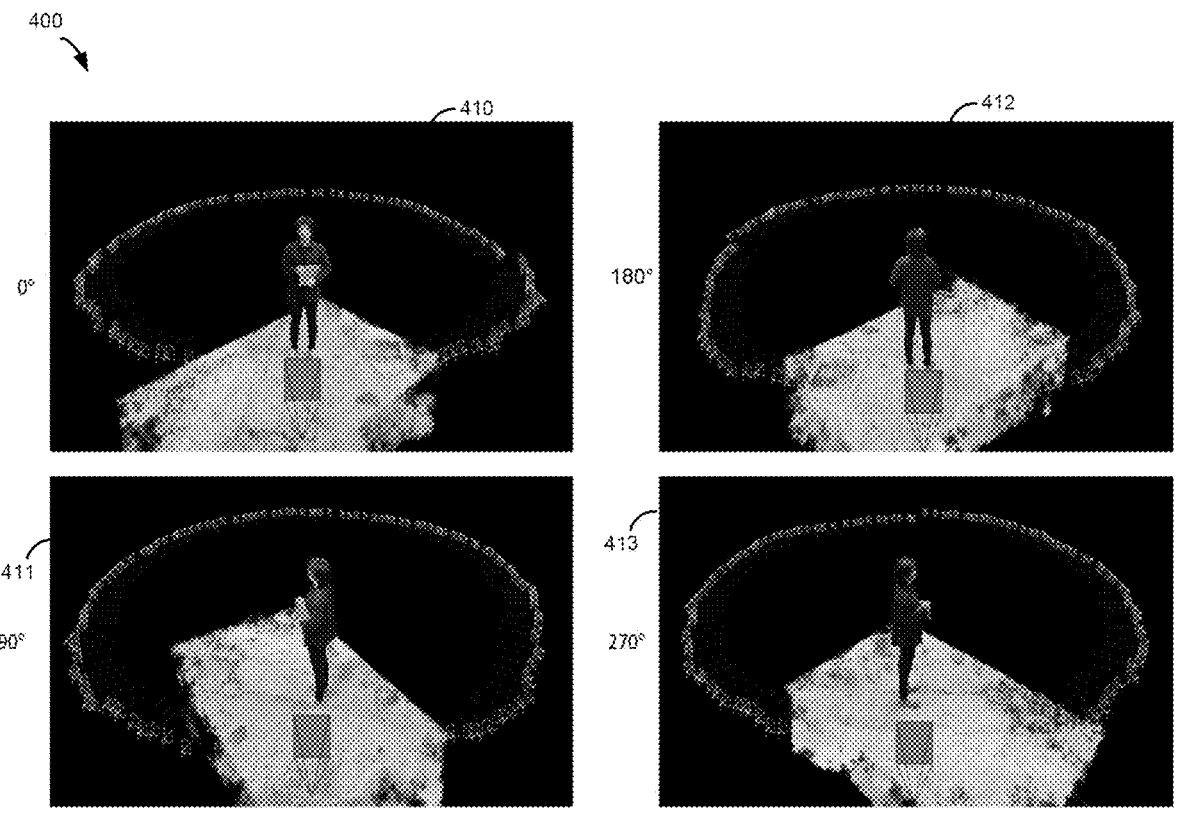
FIG. 4 illustrates an experimental effect diagram of 3D reconstruction of a real person using a 3D model processing system.

FIG. 4 illustrates an experimental effect diagram 400 of 3D reconstruction of a real person using a 3D model processing system. During the training process, 30 photographs taken at a symmetrical angle are collected. For illustrative purposes, FIG. 4 illustrates views of the 3D reconstruction of the figure separately from different angles and in the symmetrical direction, wherein a view 410 is a view of the 3D reconstruction of the figure from 0 degrees, a view 411 is a view of the 3D reconstruction of the figure from 90 degrees, a view 412 is a view of the 3D reconstruction of the figure from 180 degrees, and a view 413 is a view of the 3D reconstruction of the figure from 270 degrees.

From the quantitative results shown in Table 1 below, it can be seen that, compared with other techniques, the 3D model reconstructed based on the method of the present disclosure can have a better visualization quality and faster training convergence.

TABLE 1

| Method | PSNR | SSIM | FPS | Training time (hours) |
|---|---|---|---|---|
| NeRF (raw) | 31.01 | 0.947 | 0.023 | 48 |
| NeRF (the present disclosure) | 31.69 | 0.953 | 0.045 | 29 |
| SRN | 22.26 | 0.846 | 0.909 | 16 |
| NSVF | 31.75 | 0.953 | 0.815 | 21 |
| NeRF-SH | 31.57 | 0.952 | 167.12 | 9 |
| Some embodiments of the present disclosure | 32.11 | 0.960 | 0.051 | 6 |
| Some other embodiments of the present disclosure (SH) | 32.23 | 0.960 | 154.12 | 6.3 |

It can be observed from the table that, compared with the known techniques, the 3D model processing system implemented according to the present disclosure has better visual quality in terms of PSNR (peak signal to noise ratio) and SSIM (structural similarity index measure), and the improvements are about 0.6 dB and 0.01, respectively. At the same time, the implementation in accordance with the present disclosure can significantly reduce the originally required training time by 33% to 88%. As for the inference time, FPS (frames per second) can be used to measure the computation time. In some embodiments of the present disclosure, the corresponding method is not capable of real-time rendering and renders at about 0.051 frames per second, as shown in the table. However, in other embodiments, the method of the present disclosure is further improved by using Spherical Harmonics (SH) functions to encode the color space for offline 3D extraction. The 3D model processing system using SH can achieve 154.12 in terms of FPS, which is much higher than those of other technical solutions.

As a result, the present disclosure provides a simple and efficient method for 360-degree 3D scene reconstruction or rendering. Without any additional data storage and computational costs, embodiments of the present disclosure can be used on edge computing devices, such as smartphones and laptop computers, to implement arbitrary 360-degree 3D scene modeling. It is a core component of metaverse applications, such as customized virtual tours. Meanwhile, illustrative embodiments can be applied to data center displays, virtual object displays, and so on. The coordinate and direction mapping is decoupled by attaching a view-related 3D warping module to the equivalent view synthesis. The present disclosure uses equivalent view synthesis learning for NeRF-based 3D scene manipulation while using explicit 3D warping to supervise works generated from symmetric scene. The present disclosure can also be used for many metaverse-based applications.

Figure 5:
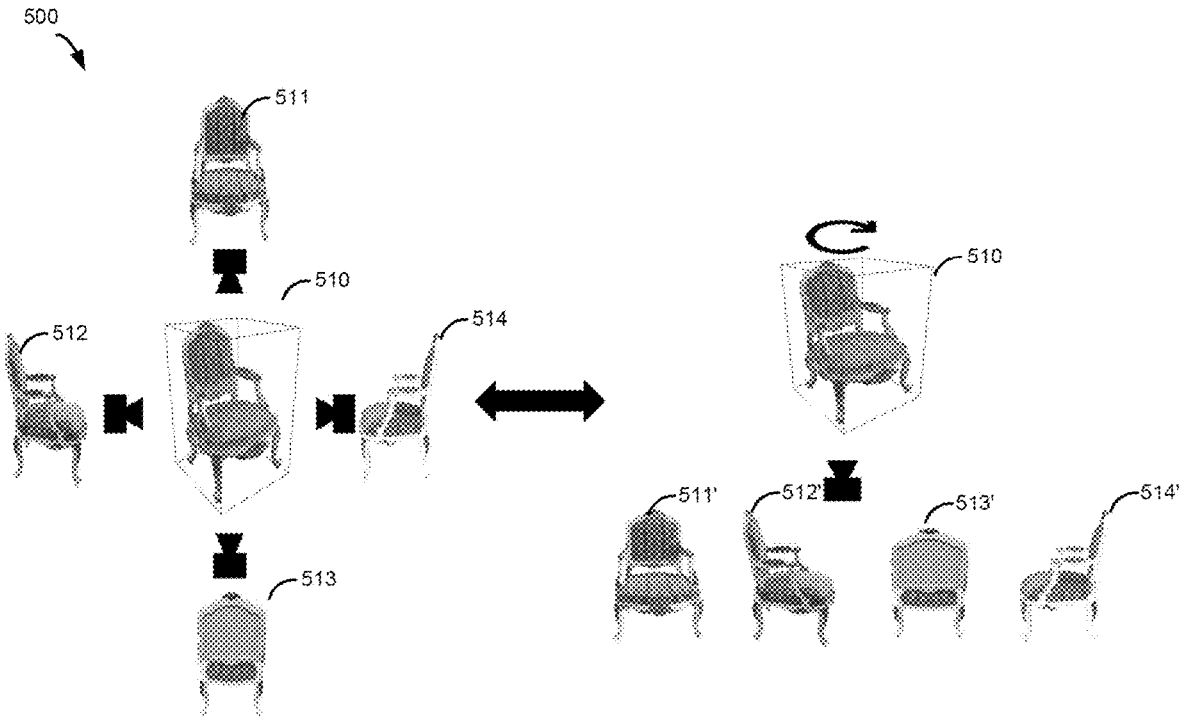
FIG. 5 illustrates a diagram of the concept of equivalent view synthesis according to embodiments of the present disclosure.

FIG. 5 illustrates a diagram 500 of the concept of equivalent view synthesis according to embodiments of the present disclosure. As shown on the left in FIG. 5, given a chair 510, the camera can be moved around the chair 510 to capture all views, such as views 511, 512, 513, and 514 that are captured for the chair 510 at different angles of view. Equivalently, as shown on the right in FIG. 5, in the case where the position of the camera is fixed, the chair 510 can be rotated 360 degrees to capture views 511', 512', 513', and 514' that are captured for the chair 510 as the chair 510 is rotated to different angles. The following equation illustrates the concept of equivalent view synthesis according to embodiments of the present disclosure:

$$H(T_z(Z)) = T_Z(H(Z)), \text{ and } H^{-1}(T_x(X)) = T_x(H^{-1}(x)) \qquad (4)$$

wherein H is mapping from 3D to 2D, $T_z$ is 3D conversion, $T_x$ is 2D conversion, and $H^{-1}$ is mapping from 2D to 3D.

In other words, when learning a new view of a 3D object, rotating the object and then capturing the new view is equivalent to rotating the camera around the object and then capturing the new view. In some embodiments, in order to consider the influence of background, binary masks may be used to select regions of interest for 3D reconstruction.

Figure 6:
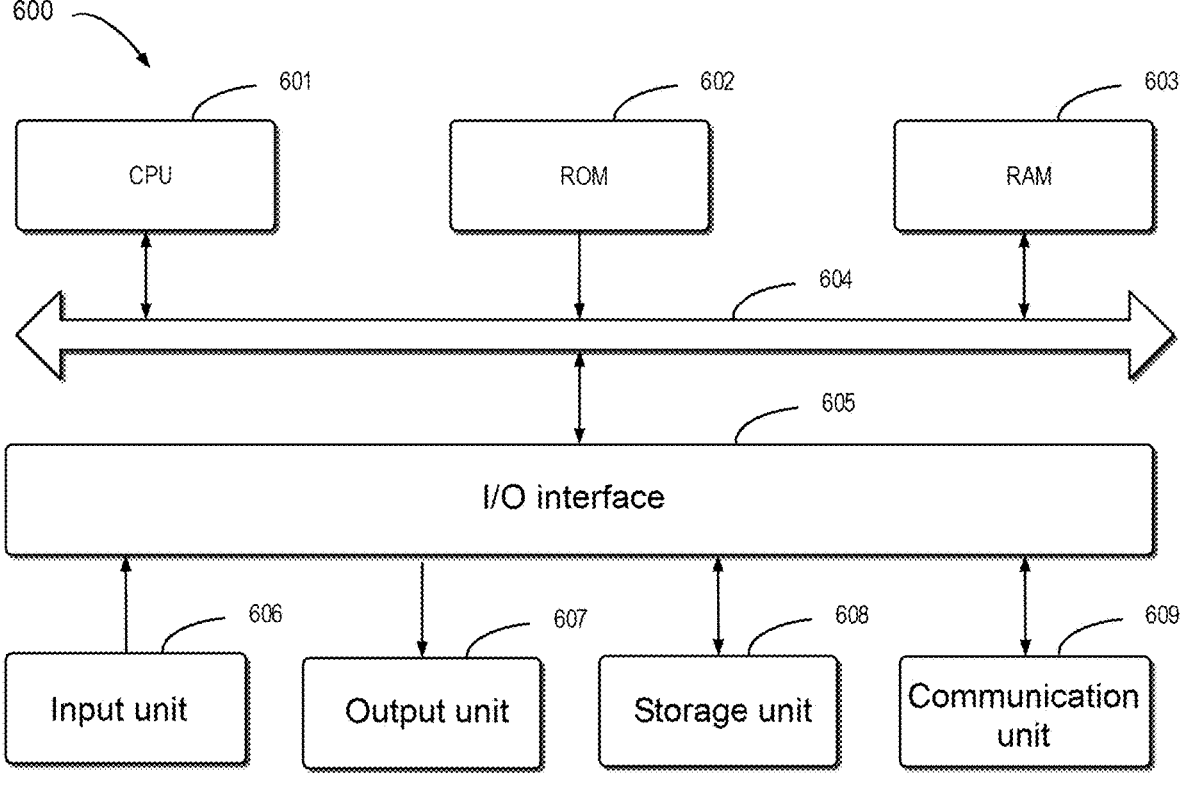
FIG. 6 illustrates a block diagram of an example device that may be used to implement embodiments of the present disclosure.

FIG. 6 shows a block diagram of an example device 600 that may be used to implement embodiments of the present disclosure. The computing device in FIG. 1 may be implemented using the device 600. As shown in the figure, the device 600 includes a central processing unit (CPU) 601 that may execute various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various processes and processing described above, such as the method 200, may be performed by CPU 601. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. One or more actions of the method 200 described above may be performed when the computer program is loaded into the RAM 603 and executed by the CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for modeling an object, comprising:
acquiring first position spatial information of a camera at a first position and second position spatial information of the camera at a second position, wherein the first position is different from the second position;
generating a spatial distribution based on the first position spatial information and the second position spatial information, wherein the spatial distribution represents a probability distribution of space occupied by the object captured from a pose of the camera;

generating a third image based on a first image captured at the first position, the spatial distribution, and the first position spatial information;

generating a fourth image based on a second image captured at the second position, the spatial distribution, and the second position spatial information; and adjusting a model of the object based on the first image, the second image, the third image, and the fourth image;

wherein adjusting the model based on the first image, the second image, the third image, and the fourth image comprises:

calculating a first difference between features of the third image and features of the second image;

calculating a second difference between features of the fourth image and features of the first image; and controlling adjustment of the model based on comparison of a function of at least the first difference and the second difference to at least one threshold.

2. The method according to claim 1, wherein generating the third image based on the first image captured at the first position, the spatial distribution, and the first position spatial information comprises:

generating a first model based on the first image and the spatial distribution;

generating a second model by performing a grid transformation of the first model based on the pose of the camera in the first position spatial information; and generating the third image by performing a two-dimensional (2D) transformation of the second model.

3. The method according to claim 2, wherein generating the first model based on the first image and the spatial distribution comprises:

determining whether a probability value above a predetermined threshold of the spatial distribution exists at a position in the first image; and acquiring one or more of color information, texture information, and depth information at the position in response to the probability value above the predetermined threshold of the spatial distribution existing at the position in the first image.

4. The method according to claim 2, wherein generating the second model by performing the grid transformation of the first model based on the pose of the camera in the first position spatial information further comprises:

predicting features in the second model by applying a bicubic interpolation method on features in the first model.

5. The method according to claim 1, wherein generating the fourth image based on the second image captured at the second position, the spatial distribution, and the second position spatial information comprises:

generating a third model based on the second image and the spatial distribution;

generating a fourth model by performing a grid transformation of the third model based on the pose of the camera in the second position spatial information; and generating the fourth image by performing a 2D transformation of the fourth model.

6. The method according to claim 1, wherein features of the third image correspond to features of the second image, and features of the fourth image correspond to features of the first image.

7. The method according to claim 1, wherein adjusting controlling adjustment of the model comprises:

continuing to adjust the model of the object in response to a sum of the first difference and the second difference being greater than a predetermined threshold; and stopping adjustment of the model of the object in response to the sum of the first difference and the second difference being smaller than the predetermined threshold.

8. The method according to claim 1, wherein adjusting the model based on the first image, the second image, the third image, and the fourth image further comprises:

adjusting the model of the object based on spatial density information, color information, texture information, and depth information in the first image, the second image, the third image, and the fourth image.

9. The method according to claim 1, wherein acquiring the first image based on the first position spatial information and acquiring the second image based on the second position spatial information comprises:

acquiring the first image and the second image by using the camera to shoot the same object at the first position and at the second position, respectively; and wherein the camera is jittered during use.

10. An electronic device, comprising:

at least one processor; and memory coupled to the at least one processor and storing instructions, wherein the instructions, when executed by the at least one processor, cause the electronic device to perform actions comprising:

acquiring first position spatial information of a camera at a first position and second position spatial information of the camera at a second position, wherein the first position is different from the second position;

generating a spatial distribution based on the first position spatial information and the second position spatial information, wherein the spatial distribution represents a probability distribution of space occupied by an object captured from a pose of the camera;

generating a third image based on a first image captured at the first position, the spatial distribution, and the first position spatial information;

generating a fourth image based on a second image captured at the second position, the spatial distribution, and the second position spatial information; and adjusting a model of the object based on the first image, the second image, the third image, and the fourth image;

wherein adjusting the model based on the first image, the second image, the third image, and the fourth image comprises:

calculating a first difference between features of the third image and features of the second image;

calculating a second difference between features of the fourth image and features of the first image; and controlling adjustment of the model based on comparison of a function of at least the first difference and the second difference to at least one threshold.

11. The electronic device according to claim 10, wherein generating the third image based on the first image captured at the first position, the spatial distribution, and the first position spatial information comprises:

generating a first model based on the first image and the spatial distribution;

generating a second model by performing a grid transformation of the first model based on the pose of the camera in the first position spatial information; and generating the third image by performing a two-dimensional (2D) transformation of the second model.

12. The electronic device according to claim 11, wherein generating the first model based on the first image and the spatial distribution comprises:

determining whether a probability value above a predetermined threshold of the spatial distribution exists at a position in the first image; and acquiring one or more of color information, texture information, and depth information at the position in response to the probability value above the predetermined threshold of the spatial distribution existing at the position in the first image.

13. The electronic device according to claim 11, wherein generating the second model by performing the grid transformation of the first model based on the pose of the camera in the first position spatial information further comprises: predicting features in the second model by applying a bicubic interpolation method on features in the first model.

14. The electronic device according to claim 10, wherein generating the fourth image based on the second image captured at the second position, the spatial distribution, and the second position spatial information comprises:

generating a third model based on the second image and the spatial distribution;

generating a fourth model by performing a grid transformation of the third model based on the pose of the camera in the second position spatial information; and generating the fourth image by performing a 2D transformation of the fourth model.

15. The electronic device according to claim 10, wherein features of the third image correspond to features of the second image, and features of the fourth image correspond to features of the first image.

16. The electronic device according to claim 10, wherein controlling adjustment of the model comprises:

continuing to adjust the model of the object in response to a sum of the first difference and the second difference being greater than a predetermined threshold; and stopping adjustment of the model of the object in response to the sum of the first difference and the second difference being smaller than the predetermined threshold.

17. The electronic device according to claim 10, wherein adjusting the model based on the first image, the second image, the third image, and the fourth image further comprises:

adjusting the model of the object based on spatial density information, color information, texture information, and depth information in the first image, the second image, the third image, and the fourth image.

18. The electronic device according to claim 10, wherein acquiring the first image based on the first position spatial information and acquiring the second image based on the second position spatial information comprises:

acquiring the first image and the second image by using the camera to shoot the same object at the first position and at the second position, respectively; and wherein the camera is jittered during use.

19. A computer program product comprising a non-transitory computer-readable storage medium having machine-executable instructions stored therein, wherein the machine-executable instructions, when executed by a machine, cause the machine to perform actions comprising:

acquiring first position spatial information of a camera at a first position and second position spatial information of the camera at a second position, wherein the first position is different from the second position;

generating a spatial distribution based on the first position spatial information and the second position spatial information, wherein the spatial distribution represents a probability distribution of space occupied by an object captured from a pose of the camera;

generating a third image based on a first image captured at the first position, the spatial distribution, and the first position spatial information;

generating a fourth image based on a second image captured at the second position, the spatial distribution, and the second position spatial information; and adjusting a model of the object based on the first image, the second image, the third image, and the fourth image;

wherein adjusting the model based on the first image, the second image, the third image, and the fourth image comprises:

calculating a first difference between features of the third image and features of the second image;

calculating a second difference between features of the fourth image and features of the first image; and controlling adjustment of the model based on comparison of a function of at least the first difference and the second difference to at least one threshold.

20. The computer program product according to claim 19, wherein generating the third image based on the first image captured at the first position, the spatial distribution, and the first position spatial information comprises:

generating a first model based on the first image and the spatial distribution;

generating a second model by performing a grid transformation of the first model based on the pose of the camera in the first position spatial information; and generating the third image by performing a two-dimensional (2D) transformation of the second model.

* * * * *